United States Patent
Garner

(10) Patent No.: US 7,311,253 B2
(45) Date of Patent: Dec. 25, 2007

(54) ANTI-THEFT/ANTI-FRAUD SYSTEM UTILIZING SPECIALIZED MERCHANDISE TAG/LABEL AND UNIQUE IDENTIFICATION CODING

(76) Inventor: Ralph Garner, 16320 Haven Wood Rd., Moreno Valley, CA (US) 92551

( * ) Notice: Subject to any disclaimer, the term of this patent is extended or adjusted under 35 U.S.C. 154(b) by 338 days.

(21) Appl. No.: 11/135,262

(22) Filed: May 23, 2005

(65) Prior Publication Data

US 2006/0261160 A1    Nov. 23, 2006

(51) Int. Cl.
*G06F 19/00* (2006.01)
(52) U.S. Cl. .................. 235/385; 235/375; 235/487; 235/454; 340/568.1; 340/568.2
(58) Field of Classification Search ............. 235/385, 235/375, 489, 494; 340/568.2, 568.1
See application file for complete search history.

(56) References Cited

U.S. PATENT DOCUMENTS

| | | | | |
|---|---|---|---|---|
| 4,799,045 A | * | 1/1989 | Fearon et al. ............. 340/572.2 |
| 5,209,513 A | * | 5/1993 | Batelli et al. ................. 283/67 |
| 5,367,148 A | * | 11/1994 | Storch et al. ................ 235/375 |
| 5,762,377 A | * | 6/1998 | Chamberlain ................. 283/67 |
| 6,018,719 A | * | 1/2000 | Rogers et al. ................ 705/24 |
| 6,547,137 B1 | * | 4/2003 | Begelfer et al. ............. 235/385 |
| 2004/0124239 A1 | * | 7/2004 | Feld ........................... 235/375 |
| 2005/0091126 A1 | * | 4/2005 | Junger ......................... 705/26 |

* cited by examiner

*Primary Examiner*—Michael G. Lee
*Assistant Examiner*—Pedro A Rojas

(57) ABSTRACT

An anti-theft/anti-fraud system includes a tag assembly that renders a retail item ineligible for merchandise return or refund if tag is removed from the retail item, if the label attached to the front side of tag has been removed or tampered with, or if the retail item is a garment that had been washed or dry-cleaned. The backside of the tag contains the anti-theft/anti-fraud system trademark and a warning message. The label thereon contains the anti-theft/anti-fraud system trademark and code data preventing the item from being returned for refund after the retailers return policy period has passed, or after the item has been washed or dry-cleaned. The tag is attached to a discreet portion of the retail item. If attachment of the tag has no feasible location then a single label is utilized and applied to a discreet portion of the retail item.

14 Claims, 1 Drawing Sheet

ANTI-THEFT/ANTI-FRAUD SYSTEM UTILIZING SPECIALIZED MERCHANDISE TAG/LABEL AND UNIQUE IDENTIFICATION CODING

PRIOR APPLICATION

This application emanates from a prior Provisional Patent Application filed 20 May 2004. Ser. No. 60/573,098.

FIELD OF THE INVENTION

This invention is an anti-theft/anti-fraud deterrent that relates to the field of retail security, specifically a system for reducing profit losses and inventory degradation to retailers related to the fraudulent return of retail goods and/or refunds therefore.

BACKGROUND OF THE INVENTION

It is a little recognized problem in the retail industry that various invisible forms of larceny cost the retail industry billions of dollars in lost revenue and profits every year. These invisible forms of larceny means are undetectable by security cameras, security devices, store detectives or store employees. Invisible forms of larceny can occur in a variety of ways. Unscrupulous customers and store employees utilize these invisible forms of larceny to cause a retailer to siphon revenues and profits for personal gain. The problem is then compounded by dishonest employees who either steal company merchandise or give it away to friends and/or relatives with the intent to profit by re-sale or return to a retail outlet for cash or credit.

An individual typically can obtain fraudulent cash refunds and/or credits from a retail outlet via return transactions of fraudulent or invalid merchandise. The cost of countless man-hours each retail outlet expends processing superfluous fraudulent return transactions will cost the retail industry additional loses of revenue and profit each year. Such fraudulent return transactions occur by means of authentic merchandise purchased from a retail outlet, after which, the merchandise is returned back to a retail outlet by means of; retail price tag deliberately changed or altered, stolen merchandise, previously worn, knowingly invalid and returned by means of customers intentionally not providing a proof of purchase receipt.

Retail outlets that accept returned merchandise from customers without a proof of purchase receipt are vulnerable to lose revenue or cash for inventory returned that was never purchased from their retail location and/or retail chain. In fact, this activity has become more prevalent (largely in effect throughout the holiday shopping seasons) since there is no means for retailers to ascertain the location of purchase, type or purchase, or date of purchase. Additionally, the authenticity of a retailer's physical inventory is compromised through such activity.

The tight labor market of recent times has created a combination of factors that have lead to higher dollar losses each year, and is on the rise throughout the entire retail industry. Record labor shortages and cutbacks leave retailers short-staffed, thereby producing opportunities for thieves to steal from them.

The state of the economy, compounded by ever more sophisticated forms of larceny, have resulted in the increasing problem of retail inventory shrinkage and profit losses. In fact, according to the latest research inventory shrinkage remains the single largest category of larceny in the United States, more than motor vehicle theft, bank robbery and household burglary combined. Retail theft is a problem that affects all consumers. The cost of consumer goods necessarily must be continuously increased to offset the losses to retailers that occur due to such fraud and theft.

When a customer returns an item to a retail outlet, it is currently nearly impossible for the retailer to ascertain whether the item was truly purchased from that retail outlet. In fact, it is nearly impossible to tell for sure whether the returned item is truly valid or whether the returned item is a counterfeit or knockoff, etc. Countless varieties of fraudulent return transactions occur daily resulting to devaluation of the inventory at the retailer as well as cause degradation of the consumer's opinion of the quality of goods to be purchased.

Garments and garment accessories are highly susceptible to these invisible forms of larceny, especially given the current trends of designer clothing deliberately made to appear as though it has been pre-washed, pre-worn, old, aged and/or matured. A typical scenario involves a person who purchases a designer garment from a major department store for $100.00. The person then goes to a discount department store, outlet mall or Internet and purchases a similar designer garment for $20.00. The person then switches the major department store retail price tag from the $100.00 garment to the $20.00 garment and then returns the lower value ($20.00) garment to the major department store for a cash refund. This same person could also purchase that same $100.00 garment, switch the retail price tag onto something old and/or used from their private inventory at home and then return the garment back to the major department store and receive a cash refund. Additionally, a person could purchase a garment on sale/clearance or deviously purchase a garment that is ticketed with a retail price tag of "NO EXCHANGE and/or NO REFUND" because of an imperfection or blemish. The person then changes the price tag with a much higher price tag and then returns the garment either to the original retail outlet of purchase or returns the item to another retail outlet and receives a cash refund or credit. A person could likewise purchase an expensive garment from a retail outlet, wear it out on the town, wash or dry-cleaned it (or maybe not) and then return the garment back to the retail outlet and receive a cash refund. A person could also purchase an authentic product from a retail outlet, change the retail price tags onto counterfeit goods, return the counterfeit goods and receive a cash refund. The retailer's inventory now contains counterfeit goods, and subsequent purchasers that become aware of this situation will be very dissatisfied at that retailer. Not only is the retailer's inventory devalued, furthermore, a dissatisfied consumer's experience of this problem and/or word of mouth to other consumers could likely lead to the retailers lost of business in the long term.

Several security methods exist in the prior art that address various forms of retail larceny. U.S. Pat. No. 4,799,045 by Fearon et al. teaches of a magnetized tag designed to thwart shoplifting of items from retail outlets. U.S. Pat No. 5,762,377 by Chamberlain defines a method for authenticating items through the use of non-removable markings, such as holograms. Begelfer et a. teach of tags with holograms in U.S. Pat. No. 6,547,137 that identify each retail item. None of these methods, however, addresses the problems associated with fraudulent returns and refunds as described above.

Current security devices cannot detect these invisible forms of fraud and larceny. Thus, a need exists to address the limitations of the current state of the art in the field. Specifically, a need exists for a system that reduces and/or eliminates the losses associated with the return of merchandise that was obtained and returned in accordance with the fraudulent schemes outlined above.

SUMMARY OF THE INVENTION

In the preferred embodiment of the invention, a system is defined that allows a retailer to determine whether merchandise presented for refund or return was indeed purchased from that retailer within the time period allowed for return as defined by that retailer's return policy. At checkout, a customer presents a garment or other retail item to the sales associate. The sales associate rings up the purchase and attaches a tag to the item prior to completion of checkout. In the case of a garment, each garment will receive a single tag that is placed in a discreet location on the item, to be determined at the discretion of the sales associate. The sales associate will attach a self-locking loop-tie through the opening of the tag, then attach a tag; to a garment through an opening of inside manufacturer's label, through an opening of a belt's loop, through a buttonhole opening, through a zipper tab opening, through an eyelet opening of a shoe/footwear, or any feasible opening on an apparel accessory.

The sales associate then applies a label to the front side of the tag that contains the retail outlet's code data and a pre-printed trademark that identifies this anti-theft/anti-fraud system. The retail outlet's code data is comprised of a string of numbers and letters that represent the location of the purchase, the date of the purchase and the type of purchase. The sales associate enters the code data into a label device applicator, ejects the label and applies the label to the front side of the tag. The XL PRO 25EEA label applicator, or similar device, is ideal for this purpose. The label can be applied to the tag (or to other rigid surface) directly using the label applicator, or can be applied by ejecting the label from the applicator and applying it to the tip of a finger and then manually applying it to the tag. The backside of the tag has a pre-printed warning message advising the customer not to wash or dry-clean the item with the tag affixed. This warning message serves as a deterrent to would-be thieves. In some instances a retail outlet can elect to apply a label to the anti-theft/anti-fraud system tag and the item's retail price tag The tag and label is tamper-proof. After the label has been applied to the tag, it will bond to the surface of the tag almost immediately. Any attempts to remove the label will result in the label breaking into pieces. Any attempts to remove the tag will result to an item as ineligible for return. The effect will be visible to a sales associate upon return of merchandise. The system will ensure valid merchandise return transactions throughout the duration of a retailer's return policy period. After which the merchandise will not be eligible for return. In an effort to facilitate the process and save time during busy times, the sales associate may pre-apply labels to a quantity of tags prior to a purchase and/or checkout. At checkout, the sales associate will advise the customer of the tag, its location, its purpose and the retailer's return policy. A designate employee ideally would be assigned to issue all tags for each register at the start of each workday. At the end of each workday an assessment of all unused tags will be compared to the purchases for the day Non-garment items can use this system as well. In the case of non-garment items, each non-garment will receive a single label that is placed in a discreet location, to be determined at the discretion of the sales associate. It is preferred the label be applied directly to the item's surface or outer packaging rather than to a tag.

The identification coding system on the label will consist of a combination of letters and numbers, comprising at least six characters. The first and second characters are letters that uniquely identify the retail outlet, e.g. "JC" for JC Penny. The third character is a single digit representing the year of the purchase. By way of illustration, 2005 would be identified by the number 5, 2006 by the number 6, and so on. 2010 would be identified by the number 0, 2011 by the number 1 and so on. The fourth and fifth characters would identify the month item was purchased. For January through September, this would only be one digit, but for October through December, there would be two digits. The next character would be a dash that separates the month of the year from the day of the month. The next character or two would identify the day of the month. Optional characters at the end of the code would further identify details about the type of purchase made. The letter W would identify the purchase as a final sale item, ineligible for refunds, credits or exchanges. The letter X would identify the purchase as one made using store credit, thereby making the item eligible only for return as store credit. The letter Y would identify the purchase as a sale/clearance item.

An example of an identification code of a product purchased with cash or credit card from Macy's on the Fourth of July 2005 would read: "MA57-4".

An example of an identification code of a product purchased with store credit from JC Penny on Christmas Eve 2004 would read: "JC412-24X".

OBJECTS OF INVENTION

The principal object of the invention is to prevent theft and fraudulent activities associated with the returns of retail merchandise to retail outlets.

It is a further object of the invention to benefit a retail outlet and it's customers by a means that will guard and secure the authenticity of a retail outlet's merchandise inventory.

It is a further object of the invention to allow a means for a retail outlet to establish a visual merchandise return contract with its customers subsequent to final checkout.

It is a further object of the invention to eliminate retail customer and retail employee merchandise return frustration, in addition, to improve a retail outlet's Total Customer Satisfaction process.

DETAILED DESCRIPTION OF AN ENABLING AND PREFERRED EMBODIMENT

Figure 1:
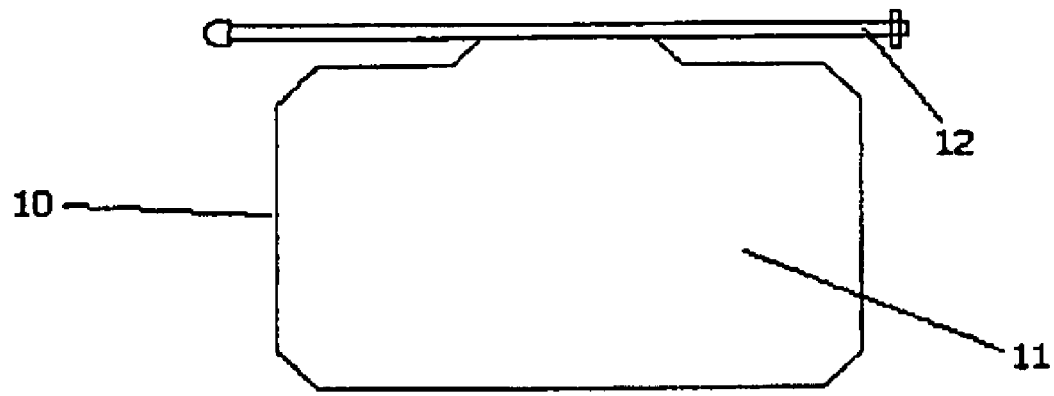
FIG. 1 illustrates the front side of the tag

For a better understanding of the invention, turning now to the drawings, FIG. 1 illustrates the front side of the tag, generally designed as character 10. The front panel 11 is the space allotted for the label to be attached prior to check out of a purchase. The tag 10 is attached to an attaching means 12 such as a plastic self-locking loop tie.

Figure 2:
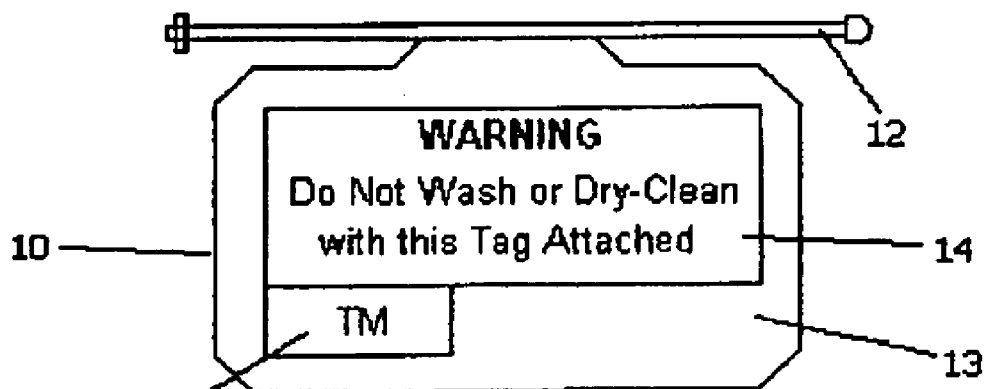
FIG. 2 illustrates the backside of the tag
Figure 3:
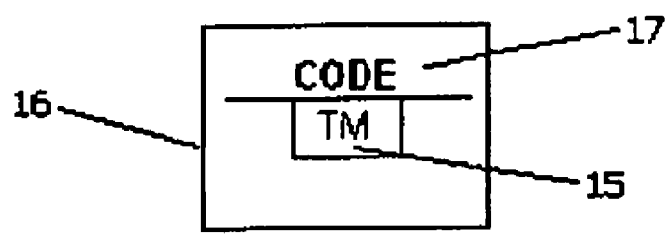
FIG. 3 illustrates the label for attachment to the front side of the tag

FIG. 2 illustrates the backside of the tag 10. The back panel 13 is the space allotted for the pre-printed warning message 14 and the trademark 15 of the anti theft/anti-fraud system. FIG. 3 illustrates the label 16 that will be affixed to the front side of the tag 11 that contains the retail outlet's code data 17 and the trademark 15 of the anti-theft/anti-fraud system.

The characters tag 10; plastic self-locking loop tie 12 and label 16 jointly represent the tag assembly.

The illustrations and examples provided herein are for explanatory purposes and are not intended to limit the scope of the appended claims, as those skilled in the art will make modifications to the invention for particular retail outlets and their return policies. This system is not limited to department store merchandise. Hardware supply stores, office supply stores and linen supply stores, as well as various other specialty stores, in addition to catalog and online retailers, can benefit as well.

I claim:

1. A method for deterring fraudulent retail merchandise returns and refunds, comprising:
   a. placement, by a retail sales associate, of a tag containing a means for attaching said tag to each retail item sold in a discreet location on said retail item, after payment of said retail item has been received;
   b. application of a unique label to a front side of the tag, said label containing coded data identifying the location of the purchase, the date of the purchase, and the type of purchase;
   c. maintenance of a warning message and an identifying trademark on a backside of said tag;
   d. daily production of said tag for attachment to retail items sold per workday;
   e. daily production of said unique label used for attachment to retail items sold per workday;
   f. assessment of all unused tags by the retailer at the end of each workday for reconciliation with the day's purchases;
   g. advisement to retail customers by said sales associate of the location of said tag and/or label and the retail outlet's return policy at checkout; and
   h. referral to said coded data portion of label by the retail sales associate at the time a customer attempts to return a given item of merchandise for determination of whether or not the item is eligible for a refund or return based on said coded data.

2. A method according to claim 1 wherein said means for attaching said tag to a retail item is a self-locking nylon tamper-proof loops tie.

3. A method according to claim 1 wherein said tag is attached to a garment through an opening of inside manufacturer's label.

4. A method according to claim 1 wherein said tag is attached to garments through an opening of a belt's loop of a trouser or skirt.

5. A method according to claim 1 wherein said tag is attached to a garment through a buttonhole opening of a shirt, sweater, or jacket.

6. A method according to claim 1 wherein said tag is attached to a garment through a zipper tab opening of a shirt, sweater, or jacket.

7. A method according to claim 1 wherein said tag is attached to a shoe or other footwear through an eyelet opening, or other feasible opening.

8. A method according to claim 7 wherein said shoe or other footwear has no available opening and said label is applied directly to any available surface.

9. A method according to claim 1 wherein said tag is attached to a garment accessory through any available location.

10. A method according to claim 1 wherein, if the retail item is not a garment, said label is applied to the item's surface instead of to the tag.

11. A method according to claim 1 wherein said label is applied directly to the tag through the use of a label applicator.

12. A method according to claim 1 wherein said label is applied first to a finger of the sales associate through the use of a label applicator, and then applied manually to said tag.

13. A method according to claim 1 wherein said code data portion involves six or more characters, said characters being a combination of letters and numbers wherein the first and second characters correspond to the identification of the retailer through the use of unique identifying letters, the third character corresponds to the year of purchase being a single number that is the last number of the year the item was sold, the fourth and fifth characters correspond to numbers that indicate the month of purchase, the fifth or sixth character is always a dash, the next one or two characters are numbers that correspond to the day of the month of the purchase and the remaining characters are unique letters that identify whether the purchase was a final sale, a purchase using store credit or a clearance sale.

14. A method according to claim 1 wherein said warning message on the backside of said tag reads: "WARNING Do Not Wash or Dry-Clean With This Tag Attached."

* * * * *